(12) United States Patent
Lv et al.

(10) Patent No.: US 11,988,852 B2
(45) Date of Patent: May 21, 2024

(54) LIGHT FIELD DISPLAY DEVICE AND DISPLAY METHOD THEREOF

(71) Applicant: Hefei University of Technology, Hefei (CN)

(72) Inventors: Guoqiang Lv, Hefei (CN); Liming Zhu, Hefei (CN); Lei Wu, Hefei (CN); Jiechao Sheng, Hefei (CN); Qibin Feng, Hefei (CN); Zi Wang, Hefei (CN)

(73) Assignee: Hefei University of Technology, Anhui (CN)

( * ) Notice: Subject to any disclaimer, the term of this patent is extended or adjusted under 35 U.S.C. 154(b) by 367 days.

(21) Appl. No.: 17/295,443

(22) PCT Filed: Nov. 13, 2019

(86) PCT No.: PCT/CN2019/117841
§ 371 (c)(1),
(2) Date: May 20, 2021

(87) PCT Pub. No.: WO2020/228282
PCT Pub. Date: Nov. 19, 2020

(65) Prior Publication Data
US 2022/0075203 A1    Mar. 10, 2022

(30) Foreign Application Priority Data

May 15, 2019   (CN) .......................... 201910402664.3

(51) Int. Cl.
*G02B 30/10*    (2020.01)

(52) U.S. Cl.
CPC .................................. *G02B 30/10* (2020.01)

(58) Field of Classification Search
CPC .... G02B 30/10; G02B 30/52; G02B 27/0012; G02B 30/27; G02F 1/1336
See application file for complete search history.

(56) References Cited

U.S. PATENT DOCUMENTS

| | | | |
|---|---|---|---|
| 6,273,571 B1 * | 8/2001 | Sharp | G02F 1/0136 348/742 |
| 6,859,240 B1 * | 2/2005 | Brown | H04N 13/305 348/E13.043 |
| 2006/0171008 A1 * | 8/2006 | Mintz | H04N 13/363 348/E13.058 |
| 2013/0077154 A1 * | 3/2013 | Popovich | H04N 13/312 359/316 |
| 2013/0100124 A1 | 4/2013 | Kim et al. | |
| 2014/0293386 A1 * | 10/2014 | Choi | G03H 1/2286 359/9 |
| 2017/0310956 A1 * | 10/2017 | Perdices-Gonzalez | G09G 3/2092 |
| 2018/0220127 A1 * | 8/2018 | Khan | H04N 13/395 |
| 2019/0243149 A1 * | 8/2019 | Iguchi | H01L 25/0753 |
| 2020/0336713 A1 * | 10/2020 | Davies | G02B 27/50 |
| 2021/0223568 A1 * | 7/2021 | Makinen | H04N 13/349 |

\* cited by examiner

*Primary Examiner* — Darryl J Collins
*Assistant Examiner* — Matthew Y Lee
(74) *Attorney, Agent, or Firm* — IPRTOP LLC (57) ABSTRACT

The present disclosure provides a light field display device, including: a backlight layer; a light control array layer; and a control layer. The backlight layer, the light control array layer, and the control layer are arranged side by side, and images on the backlight layer, the light control array layer, and the control layer are superimposed to form a three-dimensional image.

19 Claims, 5 Drawing Sheets

LIGHT FIELD DISPLAY DEVICE AND DISPLAY METHOD THEREOF

CROSS REFERENCE TO RELATED APPLICATION

This is a Sect. 371 National Stage of PCT International Application No. PCT/CN2019/117841, filed on 13 Nov. 2019, which claims priority of a Chinese Patent Application No. 2019104026643 filed on 15 May 2019, the contents of which are incorporated herein by reference in its entirety for all purposes.

FIELD OF THE INVENTION

The present disclosure relates to the technical field of three-dimensional display, in particular, to a light field display device and a display method thereof.

BACKGROUND

Three-dimensional display technology is one of the important development directions of display technology. It is deeply loved by people because of its realistic three-dimensional display effect. Three-dimensional display technology has always been one of the hot spots of academic research. Traditional commercial 3D display solutions are usually based on the principle of binocular parallax. Due to the conflict of convergence adjustment, the traditional commercial 3D display will cause asthenopia when watching. It is necessary to study the true 3D display technology without visual fatigue.

Light field 3D display technology, as a kind of true 3D display technology without visual fatigue, is one of the current research hotspots. Light field 3D display usually stacks multiple layers of display screens. According to the principle of light field superposition, the light field information in space is reproduced by adjusting the pixel information on each layer of the screens, to achieve the goal of true three-dimensional display. According to the light field theory, after a light in space passes through multiple layers of planes stacked in sequence, multiple intersections will be correspondingly left. Therefore, by controlling the pixel information of these intersections, the light can be reproduced. Then through comprehensive calculation and control of all the pixel information on the multiple layers of screens, the light field in the space can be reproduced and 3D display can be realized. Currently, light field display mainly includes integrated imaging and multi-projection array, but they all have various defects, such as low resolution, low display brightness, and poor 3D display effects.

SUMMARY

The present disclosure provides a light field display device and a display method thereof. The problems of low display brightness and poor 3D display effect in traditional light field are solved through the light field display device.

The present disclosure provides a light field display device, which includes: a backlight layer; a light control array layer; and a control layer, wherein the backlight layer, the light control array layer, and the control layer are arranged side by side, and images on the backlight layer, the light control array layer, and the control layer are superimposed to form a three-dimensional image.

Further, central axes of the backlight layer, the light control array layer, and the control layer are on a same straight line.

Further, the backlight layer includes a plurality of light-emitting units for emitting light, and the plurality of light-emitting units are independent of each other.

Further, an optical element is disposed on each of the plurality of light-emitting units.

Further, the light sequentially passes through the light control array layer and the control layer.

Further, when the light passes through the light control array layer and the control layer in sequence, an intensity of the light gradually attenuates.

Further, the light field display device includes a processing unit connected with the backlight layer, the light control array layer, and the control layer.

Further, the control layer includes a plurality of pixel units, and each of the plurality of pixel units includes a plurality of sub-pixels.

Further, the plurality of sub-pixels of each of the plurality of pixel units has the same coordinates.

Further, the light control array layer is configured to control an intensity of light.

Further, the control layer is configured to control a color of light.

Further, the light control array layer includes at least one grayscale modulator or a black-and-white screen.

Further, the control layer includes a color liquid crystal screen.

Further, the light-emitting unit includes any one of an LED, a miniLED, and a micro LED.

The present disclosure further provides a light field display method, including: providing a light field display device; collecting light field raw data, and sending the light field raw data to a processing unit to obtain coordinates of a light on a backlight layer, a light control array layer, and a control layer; decomposing the light field raw data to obtain a luminous intensity of the backlight layer, an attenuation rate of the light control array layer, and an attenuation rate of the control layer; forming corresponding images on the backlight layer, the light control array layer, and the control layer through the processing unit; forming a three-dimensional image by superimposing the images on the backlight layer, the light control array layer, and the control layer. The light field display device includes: the backlight layer; the light control array layer; and the control layer, the backlight layer, the light control array layer, and the control layer are arranged side by side, and images on the backlight layer, the light control array layer, and the control layer are superimposed to form the three-dimensional image.

Further, the processing unit obtains the luminous intensity of the backlight layer, the attenuation rate of the light control array layer, and the attenuation rate of the control layer through the following formula:

$$L_{(o_j,s_j)} = I_{(x_0,y_0)} \times f_{1(x_1,y_1)} \times f_{2(x_2,y_2)} \times \ldots \times f_{N(x_N,y_N)} \times \left(\sum_{i=1}^{3} g_{(x_{N+1},y_{N+1},i)}\right)$$

In the formula, i=1, 2, or 3 respectively represents red, green, or blue, $L(o_j, s_j)$ represents that a viewer receives light from any object point on the three-dimensional object, $I_{(x_0,y_0)}$ represents the luminous intensity of the backlight layer, $f_{N(x_N,y_N)}$ represents the attenuation rate of the light control array layer, and $g_{(x_{N+1},y_{N+1},i)}$ represents the attenuation rate of a sub-pixel of a pixel unit with a color of i of the control layer.

Further, the processing unit forms corresponding images on the backlight layer, the light control array layer, and the control layer by controlling the luminous intensity of the backlight layer, the attenuation rate of the light control array layer, and the attenuation rate of the control layer.

In summary, the present disclosure proposes a light field display device and a display method thereof. The intensity of the light is precisely controlled through the light control array layer, and the color of the light is accurately reproduced through the control layer, thereby achieving the independent control of the intensity and color of the light, effectively improving the brightness of the three-dimensional image, improving the contrast of the three-dimensional image, and improving the quality and depth of field of the three-dimensional image.

DETAILED DESCRIPTION

Some embodiments of the present disclosure will be described below. Those skilled can easily understand other advantages and effects of the present disclosure according to contents disclosed by the specification. The present disclosure can also be implemented or applied through other different specific embodiments. Various modifications or changes can also be made to all details in the specification based on different points of view and applications without departing from the spirit of the present disclosure.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complicated.

Figure 1:
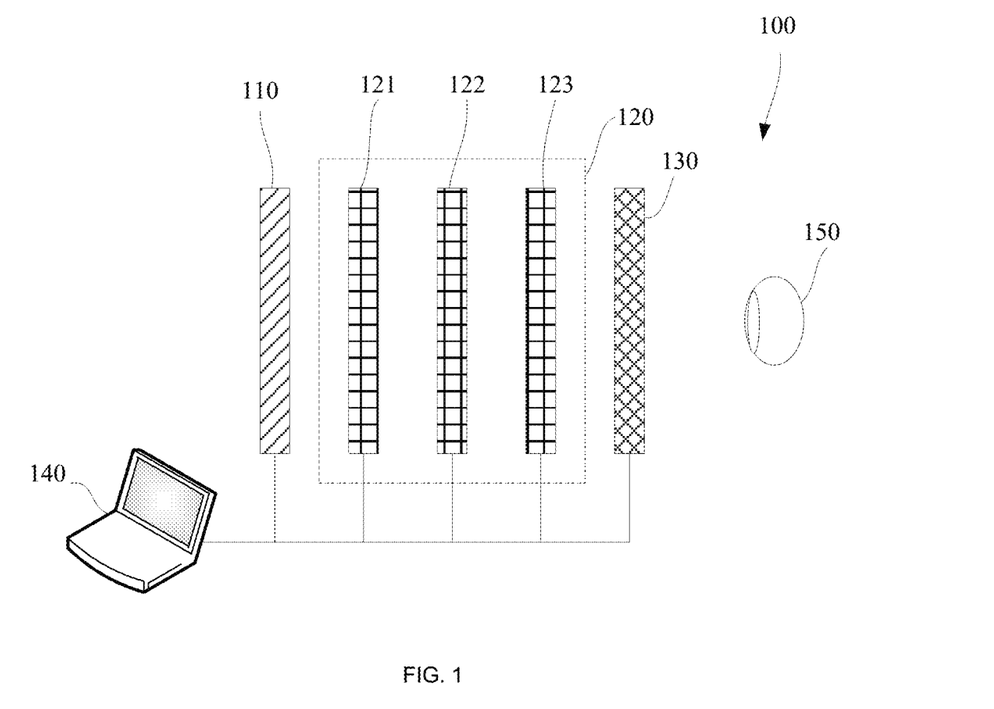
FIG. 1 shows a schematic view of a light field display device according to an embodiment of the present disclosure.

Referring to FIG. 1, this embodiment provides a light field display device 100. The light field display device 100 includes a backlight layer 110, a light control array layer 120, and a control layer 130. The backlight layer 110, the light control array layer 120, and the control layer 130 are arranged side by side in sequence, and central axes of the backlight layer 110, the light control array layer 120, and the control layer 130 are on a same straight line.

Figure 2:
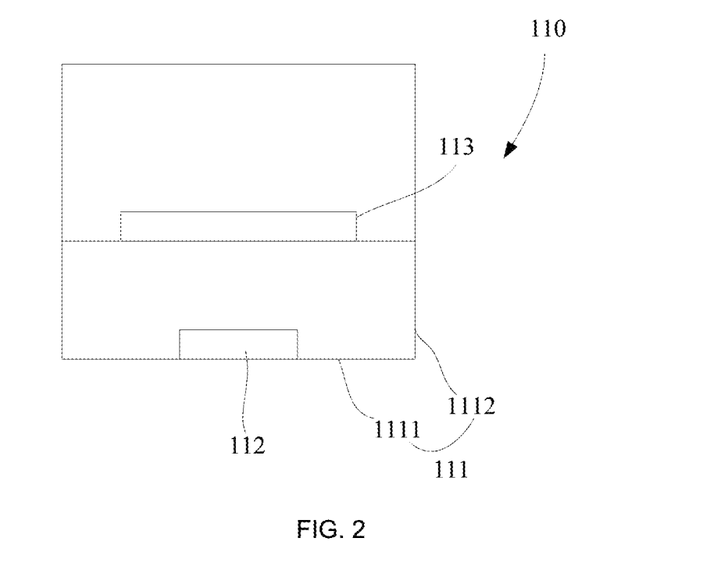
FIG. 2 shows a schematic view of a backlight layer according to an embodiment of the present disclosure.

Referring to FIGS. 1-2, the light field display device 100 includes a backlight layer 110 for emitting light, and the backlight layer 110 emits light with a certain divergence angle to the light control array layer 120 and the control layer 130. The angle of the light may range from 0-60°, such as 30-40°. The backlight layer 110 includes a backplane 111, a light-emitting unit 112, and an optical element 113. The backplane 111 includes a substrate 1111 and a plurality of backplane frames 1112. The substrate 1111 and the backplane frame 1112 may be separately molded. The material of the substrate 1111 and the backplane frame 1112 may be, for example, metal or plastic. The substrate 1111 and the backplane frame 1112 are vertically fixed. In this embodiment, the substrate 1111 and the backplane frame 1112 may be fixed by screwing, clamping, welding, or other methods. In other embodiments, a layer of heat dissipation paint may be applied to an outer surface of the backplane 111, and the heat dissipation paint applied on the outer surface of the backplane 111 improves the heat dissipation efficiency of the surface of the backplane 111. The heat dissipation paint may be, for example, boron nitride ceramic paint, aluminum nitride ceramic paint, or alumina ceramic paint. Since the heat dissipation paint is coated on the outer surface of the backplane 111, the backlight can directly dissipate heat through the backplane 111, so there is no need to use a heat sink, thereby reducing the cost and simplifying the assembly process of the backlight layer 110.

Referring to FIG. 2, the backlight layer 110 includes, for example, a light-emitting unit 112. The light-emitting unit 112 is disposed on the substrate 1111. The substrate 1111 includes a printed circuit board (not shown in the figure). The light-emitting unit 112 is packaged on a printed circuit board on the substrate 1111. The light-emitting unit 112 serves as a backlight light source, and the light-emitting unit 112 is used for emitting light. In some embodiments, the light-emitting unit 112 is disposed on a base, the base is mounted on the substrate 1111, and the base is used for connecting a circuit board on the substrate 1111. In this embodiment, the light-emitting unit 112 is, for example, any one of an LED, a microLED, or a miniLED or other light-emitting elements. In some embodiments, the light-emitting unit 112 may also be, for example, a laser diode or other light-emitting elements.

In this embodiment, one light-emitting unit 112 is disposed on the backlight layer 110. In some embodiments, M×N light-emitting units 112 may be disposed on the backlight layer 110. M and N are integers greater than 1, and M×N light-emitting units 112 may be mounted on the substrate 1111 in the manner of an M×N matrix. The M×N light-emitting units 112 work independently of each other, and the processing unit 140 can control the luminous intensity of each light-emitting unit 112.

Referring to FIG. 2, the backlight layer 110 includes, for example, an optical element 113. The optical element 113 is located above the light-emitting unit 112, and center lines of the light-emitting unit 112 and the optical element 113 are on the same line. The optical element 113 can improve the luminous brightness of the backlight layer 110. In this embodiment, the number of optical elements 113 is equal to the number of light-emitting units 112. For example, the backlight layer 110 includes M×N optical elements 113, M and N are both integers greater than 1. The arrangement of the optical elements 113 is consistent with the arrangement of the light-emitting units 112, and the M×N optical elements 113 are arranged in an M×N matrix, for example. The optical element 113 is, for example, a dual free-form-surface lens.

In some embodiments, an optical film may be disposed on the optical element 113 to further improve the luminous brightness of the backlight layer 110.

In some embodiments, the backlight layer 110 may include an illumination light source and a beam shaping beam combiner. The illumination light source may be a laser light source or an LED light source. The illumination light source may be a monochromatic light source or a polychromatic light source. The illumination light source includes, for example, a red LED light source, a green LED light source, or a blue LED light source. The color of each LED in the LED light source may be set according to actual needs to meet actual needs. The beam shaping beam combiner is arranged on the light path of the illumination light source and is used for collimating and shaping the light beam emitted by the illumination light source, and combining beams.

Referring to FIG. 1, the light field display device 100 further includes a light control array layer 120 for regulating the luminous intensity of light without changing the color of the light. In this embodiment, the light control array layer 120 includes, for example, at least one grayscale modulator. In this embodiment, for example, the light control array layer 120 includes three grayscale modulators, namely, a first grayscale modulator 121, a second grayscale modulator 122, and a third grayscale modulator 123. The first grayscale modulator 121, the second grayscale modulator 122, and the third grayscale modulator 123 are arranged in parallel and equidistantly in sequence along the axial direction, and the first grayscale modulator 121, the second grayscale modulator 122, and the third grayscale modulator 123 are parallel to each other. In this embodiment, the three grayscale modulators have the same structure, and the third grayscale modulator 123 is close to the viewer 150. When the light emitted by the backlight layer 110 sequentially passes through the first grayscale modulator 121, the second grayscale modulator 122, and the third grayscale modulator 123, the intensity of the light gradually attenuates. In some embodiments, the light control array layer 120 includes, for example, one or two or four or five or more grayscale modulators. In some embodiments, the light control array layer 120 includes, for example, at least one black-and-white screen, for example, includes one or two or three or more black-and-white screens.

Figure 3:
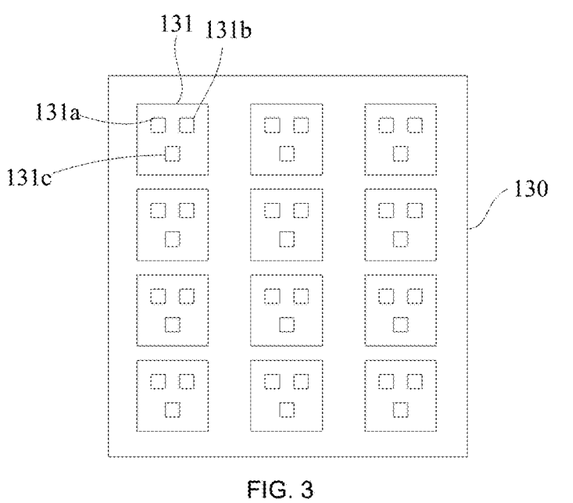
FIG. 3 shows a schematic view of a pixel unit in a control layer according to an embodiment of the present disclosure.

Referring to FIGS. 1 and 3, the light field display device 100 includes a control layer 130, and the control layer 130 is used to control the color of light and restore the color of light. In this embodiment, the control layer 130 includes a plurality of pixel units 131, and each pixel unit 131 includes three sub-pixels, such as a first pixel 131a, a second pixel 131b, and a third pixel 131c. The first pixel 131a, the second pixel 131b, and the third pixel 131c have a small pitch from each other. Therefore, in this embodiment, the coordinates of the three sub-pixels in the same pixel unit 131 are considered to be the same. In this embodiment, through the opening degree ratio of the first pixel 131a, the second pixel 131b, and the third pixel 131c, light of any color can be realized. The first pixel 131a is, for example, a red pixel. The second pixel 131b is, for example, a green pixel. The third pixel 131c is, for example, a blue pixel. In this embodiment, when light passes through the control layer 130, the intensity of the light attenuates. Since the control layer 130 includes red pixels, green pixels, and blue pixels, the attenuation value function of the light at each pixel may be obtained by calculation. The control layer 130 is close to the viewer 150, and the control layer 130 is, for example, a color liquid crystal screen.

Referring to FIG. 1, the light field display device 100 further includes a processing unit 140 connected with the backlight layer 110, the light control array layer 120, and the control layer 130 in sequence. First, the light field raw data is obtained through the light field camera or camera array, and the light field raw data is sent to the processing unit 140. The processing unit 140 decomposes the light field raw data according to the corresponding algorithm to obtain the luminous intensity of the backlight layer 110, the attenuation rate of the light control array layer 120, and the attenuation rate of the control layer 130. In this embodiment, the processing unit 140 is, for example, a computer.

In this embodiment, the processing unit 140 continuously adjusts the luminous intensity of the backlight layer 110, the attenuation rate of the light control array layer 120, and the attenuation rate of the control layer 130 to match the luminous intensity and the attenuation rate of the light, so as to form a backlight pattern on the backlight layer 110, a dimming pattern on the light control array layer 120, and a color pattern on the control layer 130. When the light field display device 100 is working, the backlight pattern, the dimming pattern, and the color pattern are superimposed to form a three-dimensional image.

Figure 4:
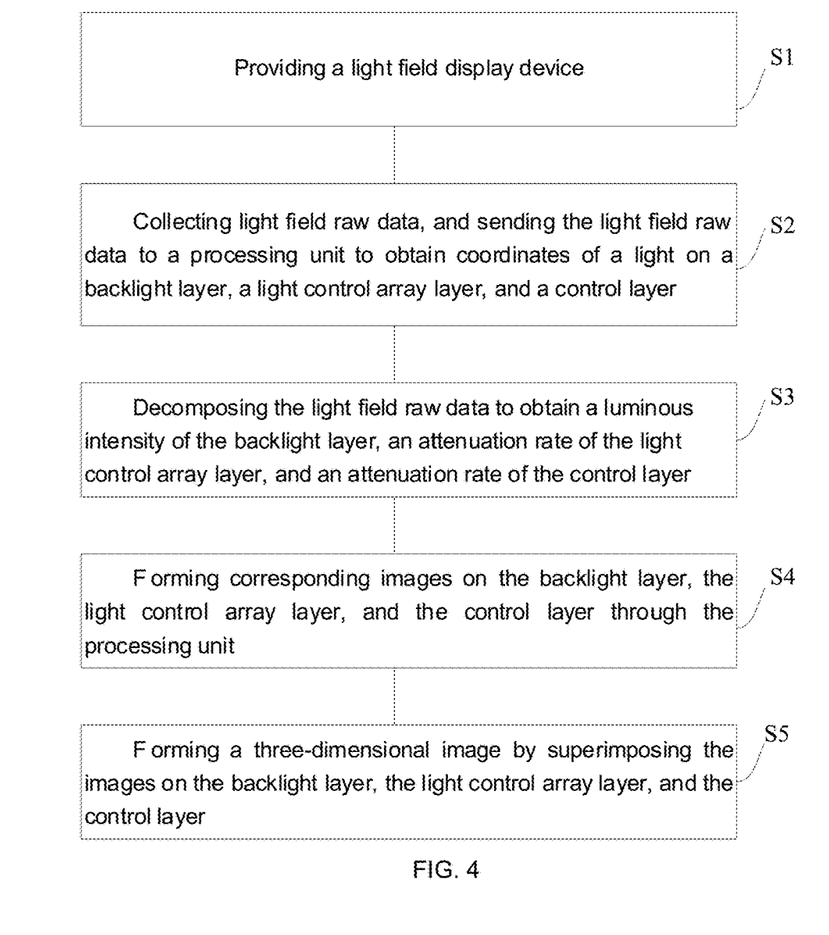
FIG. 4 shows a flow chart of a light field display method according to an embodiment of the present disclosure.

Referring to FIG. 4, in another embodiment, a light field display method includes: S1: providing a light field display device; S2: collecting light field raw data, and sending the light field raw data to a processing unit to obtain coordinates of a light on a backlight layer, a light control array layer, and a control layer; S3: decomposing the light field raw data to obtain luminous intensity of the backlight layer, an attenuation rate of the light control array layer, and an attenuation rate of the control layer; S4: forming corresponding images on the backlight layer, light control array layer, and control layer by the processing unit; and S5: forming a three-dimensional image by superimposing the images on the backlight layer, the light control array layer, and the control layer.

Referring to FIGS. 1 and 4, in operation S1, the light field display device 100 includes a backlight layer 110, a light control array layer 120, a control layer 130, and a processing unit 140. The backlight layer 110, the light control array layer 120, and the control layer 130 are arranged side by side in sequence. The light control array layer 120 may, for example, include three grayscale modulators. The processing unit 140 is connected with the backlight layer 110, the light control array layer 120, and the control layer 130 in sequence. In this embodiment, the backlight layer 110 may include, for example, a plurality of light-emitting units, which are independent of each other, and the plurality of light-emitting units are used to emit light. The control layer 130 may be, for example, a color liquid crystal screen.

Figure 5:
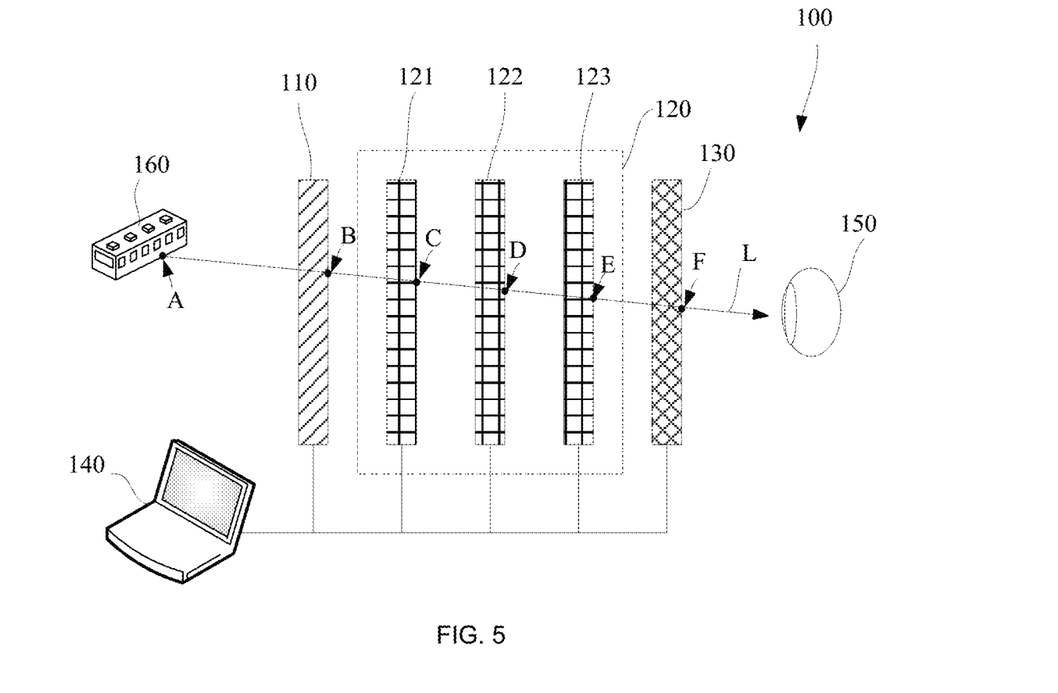
FIG. 5 shows a schematic view of a light of the light field display device according to an embodiment of the present disclosure.

Referring to FIG. 5, in operation S2, first the light field raw data is obtained through the light field camera or camera array. Specifically, according to the relative position relationship between the three-dimensional object 160 and the viewer 150, the three-dimensional object 160 is photographed from multiple angles to obtain multiple different photos to obtain the light field raw data, and the light field raw data is sent to the processing unit 140. The processing unit 140 performs reverse light tracing on the three-dimensional object 160 to obtain the coordinates of the light L on the backlight layer 110, the light control array layer 120, and the control layer 130. Because of the principle of light reversibility, when any light passes through the same intersection coordinate, the light can be reproduced by changing the luminous intensity of the backlight layer 110, the attenuation rate of the light control array layer 120, and the attenuation rate of the control layer 130. In this embodiment, assuming that the light L is emitted from point A on the three-dimensional object 160, the coordinate of the intersection of the light L and the backlight layer 110 is B, the coordinate of the intersection of the light L and the first grayscale modulator 121 is C, the coordinate of the intersection of the light L and the second grayscale modulator 122 is D, the coordinate of the intersection of the light L and the third grayscale modulator 123 is E, and the coordinate of the intersection of the light L and the control layer 130 is F.

Referring to FIG. 5, in operation S3, the processing unit 140 decomposes the light field raw data into the luminous intensity of the backlight layer 110, the attenuation rate of the light control array layer 120, and the attenuation rate of the control layer 130 through the light field decomposition algorithm. In this embodiment, the processing unit 140 obtains the luminous intensity of the backlight layer 110, the attenuation rate of the light control array layer 120, and the attenuation rate of the control layer 130 according to the following formula:

$$\begin{cases} L_1 = I_{(x_0,y_0)} \times f_{1(x_1,y_1)} \times f_{2(x_2,y_2)} \times f_{3(x_3,y_3)} \times g_{(x_4,y_4,1)} \\ L_2 = I_{(x_0,y_0)} \times f_{1(x_1,y_1)} \times f_{2(x_2,y_2)} \times f_{3(x_3,y_3)} \times g_{(x_4,y_4,2)} \\ L_3 = I_{(x_0,y_0)} \times f_{1(x_1,y_1)} \times f_{2(x_2,y_2)} \times f_{3(x_3,y_3)} \times g_{(x_4,y_4,3)} \\ L = L_1 + L_2 + L_3 \end{cases}$$

$L_1$, $L_2$, and $L_3$ represent the red, green, and blue intensity components of the light L, respectively. $I_{(x_0,y_0)}$ represents the luminous intensity of the backlight layer 110. $f_{1(x_1,y_1)}$, $f_{2(x_2,y_2)}$, $f_{3(x_3,y_3)}$ represent the attenuation rate the first grayscale modulator 121, the second grayscale modulator 122, and the third grayscale modulator 123, respectively. $g_{(x_4,y_4,1)}$, $g_{(x_4,y_4,2)}$, $g_{(x_4,y_4,3)}$ represents the attenuation rate of the first pixel 131a, the second pixel 131b, and the third pixel 131c on the control layer 130, respectively.

Referring to FIG. 5, in operation S4, after the luminous intensity of the backlight layer 110, the attenuation rates of the light control array layer 120 and the control layer 130 are obtained, the processing unit 140 continuously controls the luminous intensity of the backlight layer 110, the attenuation rate of the light control array layer 120, and the attenuation rate of the control layer 130, to form a backlight image on the backlight layer 110, three dimming images on the light control array layer 120, and a color image on the control layer 130. In this embodiment, the processing unit 140 may control the attenuation rate of the display unit (pixel unit) on the light control array layer 120 through the coordinates of the light on the light control array layer 120, and then display the dimming pattern on the light control array layer 120. The processing unit 140 may control the attenuation rate of the pixel units on the control layer 130 through the coordinates of the light on the control layer 130, and then display the color pattern on the control layer 130.

In this embodiment, the attenuation rate $f_{N(x_N,y_N)}$ of the light control array layer 120 is a ternary data structure. For each fixed N value (the serial number of the grayscale modulator), the attenuation rate $f_{N(x_N,y_N)}$ is the image displayed in the corresponding grayscale modulator.

Referring to FIG. 5, in operation S5, when the backlight layer 110, the light control array layer 120, and the control layer 130 work together, the backlight image on the backlight layer 110, the three dimming images formed on the light control array layer 120, and the color image formed on the control layer 130 are superimposed to form a three-dimensional image.

Figure 6:
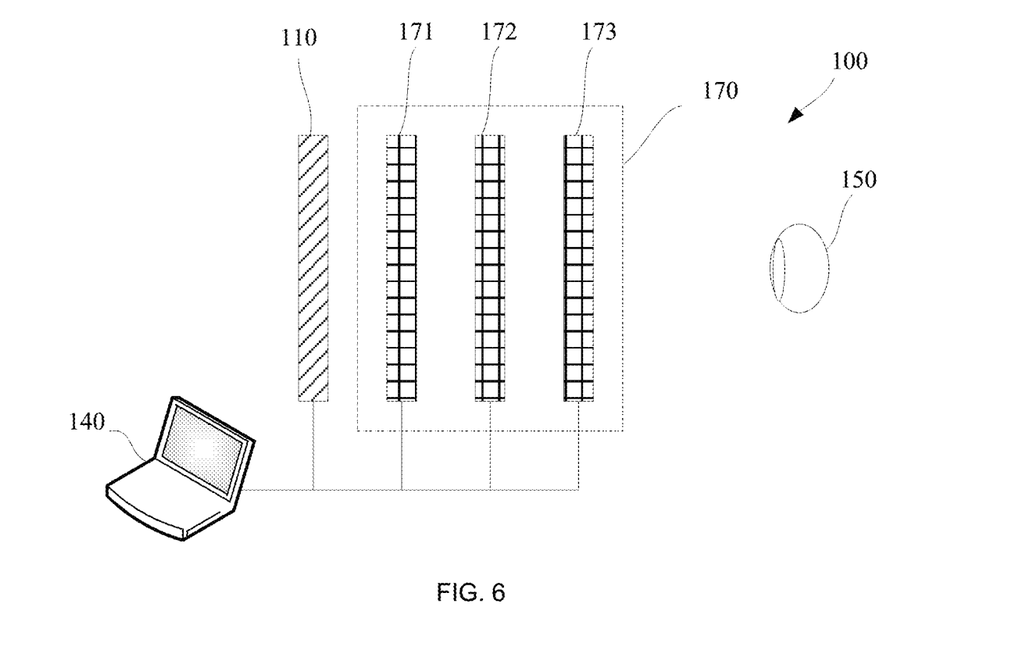
FIG. 6 shows a schematic view of a light field display device according to another embodiment of the present disclosure.

Referring to FIG. 6, in some embodiments, the light field display device 100 includes, for example, a backlight layer 110 and a modulation array layer 170. The backlight layer 110 and the modulation array layer 170 are sequentially arranged in parallel, and the backlight layer 110 and the modulation array layer 170 are respectively connected with the processing unit 140.

Referring to FIG. 6. In this embodiment, the backlight layer 110 is used to emit light, and the modulation array layer 170 is used to adjust the transmittance of light. The modulation array layer 170 includes a plurality of liquid crystal layers, for example, includes three liquid crystal layers, which are a first liquid crystal layer 171, a second liquid crystal layer 172, and a third liquid crystal layer 173, respectively. The first liquid crystal layer 171, the second liquid crystal layer 172, and the third liquid crystal layer 173 are sequentially arranged in parallel at equal intervals. The first liquid crystal layer 171 is away from the viewer 150, and the third liquid crystal layer 173 is close to the viewer 150. The first liquid crystal layer 171, the second liquid crystal layer 172, and the third liquid crystal layer 173 are respectively connected with the processing unit 140. Each liquid crystal layer includes a plurality of pixel units, and the number of pixel units on each liquid crystal layer is equal to the number of light-emitting units on the backlight layer 110. The processing unit 140 solves the transmittance of each liquid crystal layer and the luminous intensity of the backlight layer 110 through a three-dimensional light field algorithm to reconstruct the light field and output the image source. In some embodiments, the modulation array layer 170 may include, for example, four or more liquid crystal layers.

Figure 7:
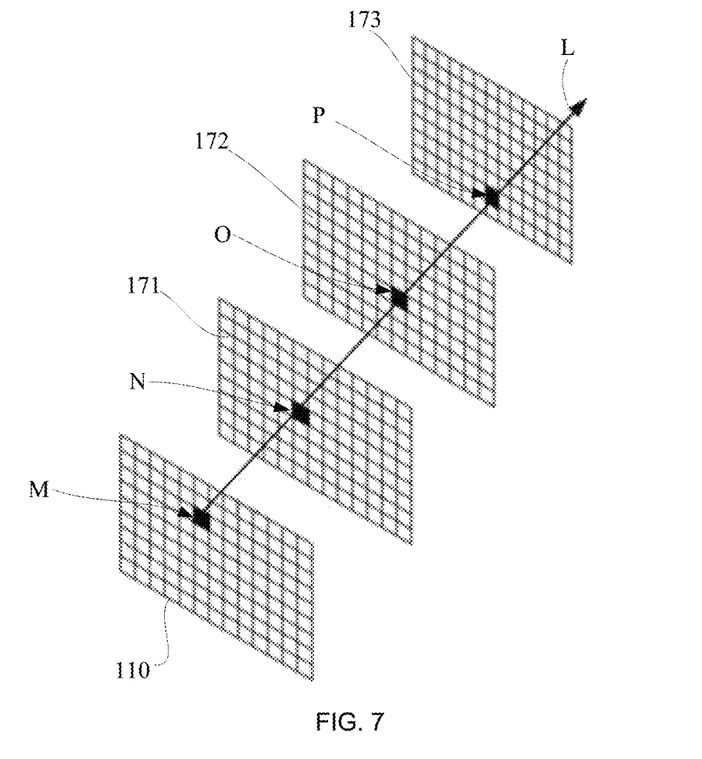
FIG. 7 shows a schematic view of a light of the light field display device according to an embodiment of the present disclosure.

Referring to FIG. 7, in this embodiment, the processing unit 140 calculates the positions where each light L passes through the backlight layer 110 and each liquid crystal layer. It is assumed that the position where the light L passes through the backlight layer 110 is M, and the positions where the light L passes through the first liquid crystal layer 171, the second liquid crystal layer 172, and the third liquid crystal layer 173 are N, O, and P, respectively. The coordinates of M are $(x_0, y_0)$, the coordinates of N are $(x_1, y_1)$, the coordinates of O are $(x_2, y_2)$, and the coordinates of P are $(x_3, y_3)$. In this embodiment, the light L is the light that can reach the viewer in the propagation direction.

Figure 8:
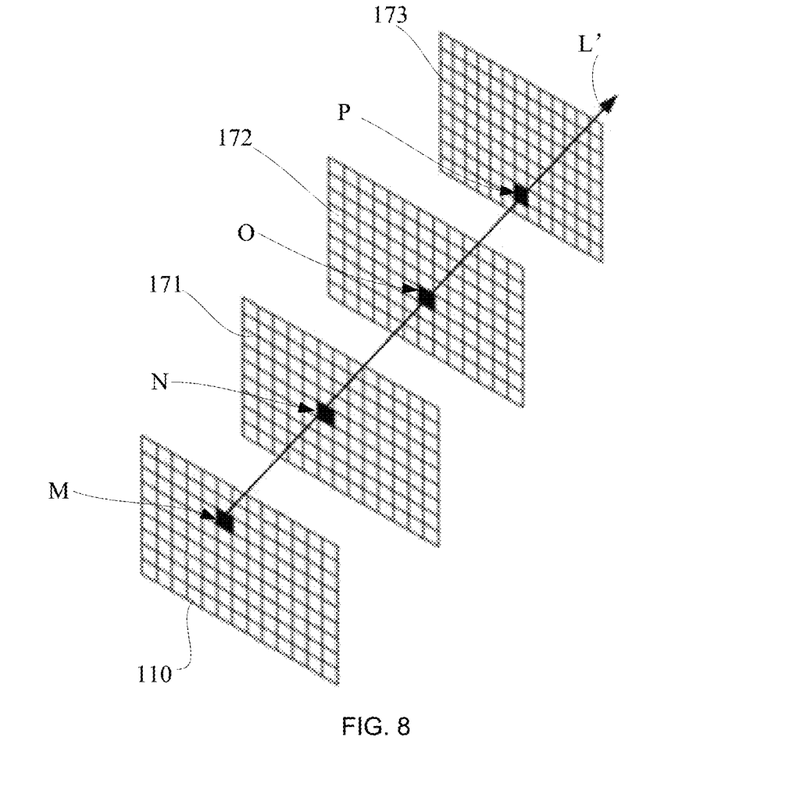
FIG. 8 shows a schematic view of reconstructing light according to an embodiment of the present disclosure.

Referring to FIGS. 7-8. In this embodiment, the light L' is reconstructed from the light L. The light L and the light L' travel in the same direction, and the luminous intensity that the light L' passes through $(x_0, y_0)$, $(x_1, y_1)$, $(x_2, y_2)$, $(x_3, y_3)$ can be expressed as $L' = I_{(x_0,y_0)} \times f_{1(x_1,y_1)} \times f_{2(x_2,y_2)} \times f_{3(x_3,y_3)}$. $I(x_0, y_0)$ represents the luminous intensity of the coordinate $(x_0, y_0)$ on the backlight layer 110, $f_{1(x_1, y_1)}$ represents the transmittance of a pixel unit with a coordinate $(x_1, y_1)$ on the first liquid crystal layer 171, $f_{2(x_2, y_2)}$ represents the transmittance of a pixel unit with a coordinate $(x_2, y_2)$ on the second liquid crystal layer 172, and $f_{3(x_3, y_3)}$ represents the transmittance of a pixel unit with a coordinate $(x_3, y_3)$ on the third liquid crystal layer 173.

In this embodiment, when a three-dimensional image is formed by the light field display device, the processing unit 140 can transmit the two-dimensional image representing the luminous intensity distribution of the backlight module to the backlight layer and transmit the two-dimensional image representing the attenuation rate of each liquid crystal layer to the corresponding liquid crystal layer. When the backlight layer and the liquid crystal layer work together, the viewer can experience the three-dimensional image.

In summary, this embodiment proposes a light field display device and a display method thereof. The intensity of the light is precisely controlled through the light control array layer, and the color of the light is accurately reproduced through the control layer, thereby achieving the independent control of the intensity and color of the light, effectively improving the brightness of the three-dimensional image, improving the contrast of the three-dimensional image, and improving the quality and depth of field of the three-dimensional image.

The above description is only a preferred embodiment of the present disclosure and an explanation of the technical principles used. Those skilled in the art should understand that the scope involved in the present disclosure is not limited to the technical solution formed by the specific combination of the above technical features, but should also cover other technical solutions formed by any combination of the above technical features or their equivalents without departing from the concept of the present disclosure, such as technical solutions formed by replacing the above-mentioned features with the technical features disclosed (but not limited to) in the present disclosure with similar functions.

Except for the technical features described in the specification, the other technical features are known to those skilled in the art. In order to highlight the innovative features of the present disclosure, the rest of the technical features will not be repeated here.

The invention claimed is:

1. A light field display device, comprising:
a backlight layer;
a light control array layer;
a control layer; and
a processing unit; wherein the backlight layer, the light control array layer, and the control layer are arranged side by side, and images on the backlight layer, the light control array layer, and the control layer are superimposed to form a three-dimensional image,
wherein the processing unit obtains a luminous intensity of the backlight layer, an attenuation rate of the light control array layer, and an attenuation rate of the control layer through the following formula:

$$L_{(o_j,s_j)} = I_{(x_0,y_0)} \times f_{1(x_1,y_1)} \times f_{2(x_2,y_2)} \times \ldots \times f_{N(x_N,y_N)} \times \left(\sum_{i=1}^{3} g_{(x_{N+1},y_{N+1},i)}\right),$$

wherein i=1, 2, or 3 respectively represents red, green, or blue, $L_{(o_j,s_j)}$ represents that a viewer receives light from any object point on a three-dimensional object, $I_{(x_0,y_0)}$ represents the luminous intensity of the backlight layer, $f_{N(x_N,y_N)}$ represents the attenuation rate of the light control array layer, and $g_{(x_{N+1},y_{N+1},i)}$ represents the attenuation rate of a sub-pixel of a pixel unit with a color of i of the control layer.

2. The light field display device according to claim 1, wherein central axes of the backlight layer, the light control array layer, and the control layer are on a same straight line.

3. The light field display device according to claim 2, wherein a light sequentially passes through the light control array layer and the control layer.

4. The light field display device according to claim 1, wherein the backlight layer comprises a plurality of light-emitting units for emitting light, and the plurality of light-emitting units are independent of each other.

5. The light field display device according to claim 4, wherein an optical element is disposed on each of the plurality of light-emitting units.

6. The light field display device according to claim 4, wherein when the light passes through the light control array layer and the control layer in sequence, an intensity of the light gradually attenuates.

7. The light field display device according to claim 4, wherein the light-emitting unit comprises any one of an LED, a miniLED, and a micro LED.

8. The light field display device according to claim 1, wherein the control layer comprises a plurality of pixel units, and each of the plurality of pixel units includes a plurality of sub-pixels.

9. The light field display device according to claim 8, wherein the plurality of sub-pixels of each of the plurality of pixel units has same coordinates.

10. The light field display device according to claim 1, wherein the processing unit is connected with the backlight layer, the light control array layer, and the control layer.

11. The light field display device according to claim 1, wherein the light control array layer is configured to control an intensity of light.

12. The light field display device according to claim 1, wherein the control layer is configured to control a color of light.

13. The light field display device according to claim 1, wherein the light control array layer comprises at least one grayscale modulator or black-and-white screen.

14. The light field display device according to claim 1, wherein the control layer comprises a color liquid crystal screen.

15. A light field display method, comprising:
providing a light field display device;
collecting light field raw data, and sending the light field raw data to a processing unit to obtain coordinates of a light on a backlight layer, a light control array layer, and a control layer;
decomposing the light field raw data to obtain, by the processing unit, a luminous intensity of the backlight layer, an attenuation rate of the light control array layer, and an attenuation rate of the control layer through the following formula:

$$L_{(o_j,s_j)} = I_{(x_0,y_0)} \times f_{1(x_1,y_1)} \times f_{2(x_2,y_2)} \times \ldots \times f_{N(x_N,y_N)} \times \left(\sum_{i=1}^{3} g_{(x_{N+1},y_{N+1},i)}\right),$$

wherein i=1, 2, or 3 respectively represents red, green, or blue, $L_{(o_j,s_j)}$ represents that a viewer receives light from any object point on a three-dimensional object, $I_{(x_0,y_0)}$ represents the luminous intensity of the backlight layer, $f_{(x_N,y_N)}$ represents the attenuation rate of the light control array layer, and $g_{(x_{N+1},y_{N+1},i)}$ represents the attenuation rate of a sub-pixel of a pixel unit with a color of i of the control layer;
forming corresponding images on the backlight layer, the light control array layer, and the control layer through the processing unit; and
forming a three-dimensional image by superimposing the images on the backlight layer, the light control array layer, and the control layer;
wherein the light field display device includes:
the backlight layer;
the light control array layer; and
the control layer, wherein the backlight layer, the light control array layer, and the control layer are arranged side by side, and images on the backlight layer, the light control array layer, and the control layer are superimposed to form the three-dimensional image.

16. The light field display method according to claim 15, wherein the processing unit forms corresponding images on the backlight layer, the light control array layer, and the control layer by controlling the luminous intensity of the backlight layer, the attenuation rate of the light control array layer, and the attenuation rate of the control layer.

17. The light field display method according to claim 15, wherein the backlight layer comprises a plurality of light-emitting units for emitting light, and the plurality of light-emitting units are independent of each other.

18. The light field display method according to claim 15, wherein the light control array layer comprises at least one grayscale modulator or black-and-white screen.

19. The light field display method according to claim 15, wherein the control layer comprises a color liquid crystal screen.

* * * * *